United States Patent
Jia et al.

(12) 
(10) Patent No.: US 6,870,959 B1
(45) Date of Patent: Mar. 22, 2005

(54) METHOD FOR AUTOMATIC REMOVAL OF VERTICAL STREAKS BY MODIFYING IMAGE DATA ASSOCIATED WITH NON-HOMOGENOUS IMAGE ELEMENTS

(75) Inventors: Charles Chi Jia, San Diego, CA (US); Gary M. Nobel, Poway, CA (US); Cindy Sansom, San Diego, CA (US); Howard Merrill, Poway, CA (US); Daniel Wee, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/414,391

(22) Filed: Oct. 7, 1999

(51) Int. Cl.[7] .................................................. G06K 9/40
(52) U.S. Cl. ........................ 382/202; 382/262; 382/275
(58) Field of Search ............................... 382/199, 202, 382/275, 262

(56) References Cited

U.S. PATENT DOCUMENTS

| | | | | |
|---|---|---|---|---|
| 5,065,444 A | * | 11/1991 | Garber | 382/275 |
| 5,625,719 A | * | 4/1997 | Fast et al. | 382/275 |
| 5,881,182 A | * | 3/1999 | Fiete et al. | 382/275 |
| 5,946,416 A | * | 8/1999 | Akagi et al. | 382/194 |
| 6,035,072 A | * | 3/2000 | Read | 382/275 |
| 6,317,223 B1 | * | 11/2001 | Rudak et al. | 382/275 |

FOREIGN PATENT DOCUMENTS

JP  08272956 A  * 10/1996  ............. G06T/5/00

OTHER PUBLICATIONS

Abreu et al. "A Simple Algorithm for Restoration of Images Corrupted by Streaks." ISCAS '96, IEEE Int. Symp. on Circuits and Systems, vol. 2, May 12, 1996, pp. 730–733.*

* cited by examiner

*Primary Examiner*—Jon Chang

(57) ABSTRACT

A method for automatic removal of vertical streaks involves a comparison between image data for a pixel and its neighbor pixels to determine whether the pixel is non-homogenous. In a preferred method, the comparison employs an adaptive threshold against which a difference between the pixel and its neighbor pixels is compared, with the adaptive threshold taking into account accumulative information pertaining to pixels generated by a common optical sensor element. A preferred method also includes the step of considering locations of non-homogenous pixels in the image to determine whether the image data associated with the non-homogenous pixels needs to be changed or modified. A preferred method also includes the step of associating the non-homogenous pixels with different image data.

24 Claims, 7 Drawing Sheets

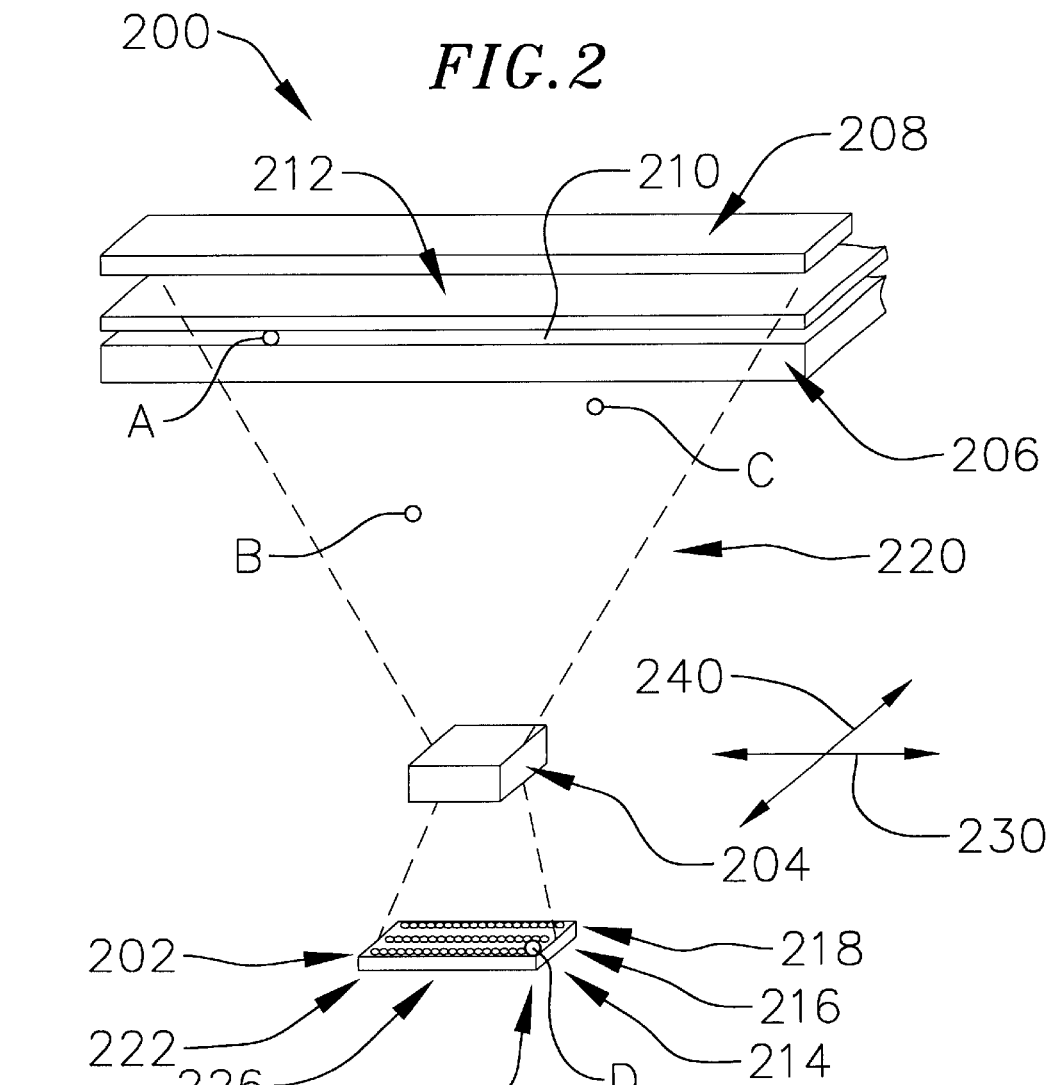
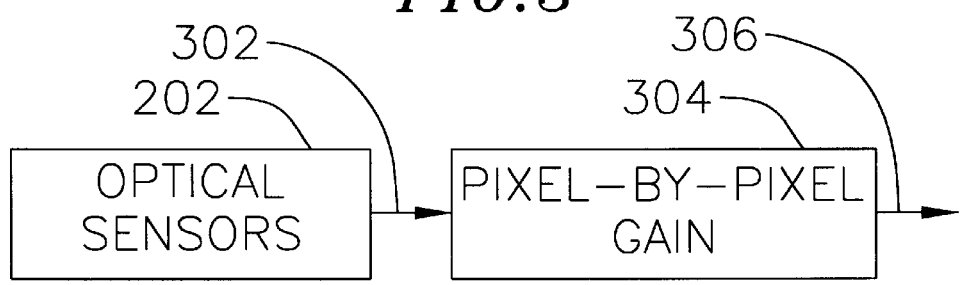

METHOD FOR AUTOMATIC REMOVAL OF VERTICAL STREAKS BY MODIFYING IMAGE DATA ASSOCIATED WITH NON-HOMOGENOUS IMAGE ELEMENTS

CROSS-REFERENCE TO RELATED APPLICATIONS

This application is related to U.S. patent application Ser. No. 09/414,023 entitled "Method For Automatic Prevention Of Vertical Streaks By Selectively Applying Gains To The Output Signals Of Optical Sensor Elements" filed herewith now U.S. Pat. No. 6,618,173.

BACKGROUND OF THE INVENTION

1. Field of Invention

The present invention relates generally to a method for automatic removal of vertical streaks and, more specifically, to a method for automatic removal of vertical streaks by modifying image data associated with non-homogenous image elements.

2. Description of the Related Art

Scanners typically include an array of optical sensor elements and a scan area (e.g., plate of glass) where an object to be imaged by the sensor elements is positioned. An optical path including, for example, lens and mirrors, spans between the sensor elements and the scan area.

Referring to FIG. 2, a subsystem 200 of a typical scanner includes an optical sensor device 202, a lens 204, a transparent plate 206 and a calibration strip 208. The transparent plate 206 includes a scan area surface 210 over which an object 212 to be scanned is positioned. An exemplary calibration strip 208 spans across the entire scan area surface 210 and is formed from plastic with a uniform exterior color such as white.

The optical sensor device 202 is typically a linear array of optical sensor elements or photosites which convert optical images to electrical output signals. An exemplary optical sensor device 202 comprises a 2,700-bit×3 CCD (Charge Coupled Device) color linear image sensor such as the NEC μPD3720 integrated circuit which has a color filter that provides primary colors (red, green and blue) via rows of photosites 214, 216 and 218, respectively, which are arranged on the sensor device 202 as shown.

A problem with the subsystem 200 is that different photosites, due to manufacturing imperfections, do not necessarily generate the same output signal when imaging identical objects. Another problem with the subsystem 200 is that the optical path 220 (shown unfolded) between the optical sensor device 202 and the object 212 introduces inconsistencies in the output signals because the photosites at the end portions 222 and 224 of the optical sensor device 202 receive lower levels of light from an object 212 of uniform color than the photosites near the center portion 226 of the optical sensor device 202. Therefore, in order to achieve uniformity in the levels of the output signals across the optical sensor device 202, some form of compensation or calibration of the output signals is necessary. To this end, the subsystem 200 includes the calibration strip 208 which is used to calibrate the output signals of the optical sensor device 202.

Referring to FIG. 3, a functional block diagram 300 shows that output signals 302 generated by the optical sensors 202 are provided with pixel-by-pixel gain 304 to generate calibrated output signals 304. During the calibration process, the photosites of the optical sensor device 202 image the uniformly colored calibration strip 208 before the object 212 to be scanned is positioned on the scan area surface 210. Each photosite in the scanner is "queried" to determine how much light it "sees". Across the optical sensor device 202, from the left end 222 to the right end 224, the output signals 302 appear, for example, as shown in FIG. 4. In order to achieve uniformity in the levels of the output signals across the optical sensor device 202, a "proportionate" pixel-by-pixel gain 304 as shown in FIG. 5 is applied to the output signals 302. The term "proportionate" means an inversion or other appropriate function of the output signals 302 such that the calibrated output signals 304 appear as the uniform output level shown in FIG. 6. By way of example, suppose an average photosite reports a value of 100. If one photosite reports a lower value—say 50—then the amplification for that one photosite will be set twice as high as the amplification for the average photosite. After the calibration process is completed, the pixel-by-pixel gain 304 is saved, for example, in firmware of the scanner, and applied during subsequent scanning. Thus, the net signal from the photosite and its amplification are the same for all photosite-amplification pairs.

Even though each photosite gets a "customized" amplification, unfortunately, this does not accommodate a situation where an optical obstruction is positioned between the calibration strip 208 and the scan area surface 210 during the calibration process. The term "optical obstruction" means an object which has any effect on light transmitted therethrough. Optical obstructions include, but are not limited to, paper dust, plastic dust, skin particles, metal particles and glass particles.

Referring again to FIG. 2, the subsystem 200 is shown with optical obstructions "A", "B", "C" and "D" positioned between the optical sensor device 202 and the calibration strip 208. More specifically, the optical obstructions "A", "B", "C" and "D" are positioned, respectively, on the scan area surface 210, in the optical path 220, in the optical path 220 sufficiently near the scan area surface 210 to be illuminated by a light source (not shown), and on the optical sensor device 202. The optical obstructions "A", "B" and "D" are dark debris which are light-absorbing, i.e., tending to absorb light. The optical obstruction "C" is reflective. During the calibration process, when these optical obstructions are present, the output signals 302, from the left end 222 to the right end 224 of the optical sensor device 202, appear, for example, as shown in FIG. 7. In order to achieve uniformity in the levels of the output signals across the optical sensor device 202, a "proportionate" pixel-by-pixel gain 304 as shown in FIG. 8 is applied to the output signals 302. As shown in FIG. 9, a uniform photosite output signal level with proportionate gain applied is the result of the calibration process. However, if the optical obstruction "A" is displaced from the optical path 220, for example, by an object 212 moving across the scan area surface 210, the calibrated output signal levels will then appear as shown in FIG. 10 with a large spike corresponding to the photosite that was imaging the optical obstruction "A" during the calibration process. As a result, during scanning, this erroneously high gain causes all scan data from that photosite to have a higher signal than it should. The net effect is that there is a bright vertical line in the scan, copy or fax output which runs the entire length of the image.

Vertical lines or streaks in scan, copy or fax output can also be caused by transient debris or optical obstructions which, for example, fall into the optical path 220 of the optical sensor device 202 after the calibration has occurred. Vertical lines or streaks can also be caused by dead pixels, hot pixels, photosite offset non-uniformities and other photosite and imaging system malfunctions and non-uniformities. Thus, a need exists for a method for eliminating vertical lines or streaks in scan data.

SUMMARY OF THE INVENTION

A method for automatic removal of vertical streaks in accordance with one embodiment of the present invention includes the steps of: receiving data pertaining to an image, different portions of the data being provided by different imaging devices; comparing the data provided by the different imaging devices to identify non-homogenous elements of the image; and modifying the data associated with the non-homogenous elements.

A method for automatic removal of vertical streaks in accordance with another embodiment of the present invention includes the steps of: receiving image data pertaining to pixels of an image; and processing the image data to determine whether the image data for a group of pixels associated with a common optical sensor is sufficiently different from the image data for neighbor pixels to designate any of the pixels of the group of pixels as non-homogenous.

In a preferred embodiment, the method also includes the step of considering locations of the non-homogenous pixels within the image to determine whether the image data associated with the non-homogenous pixels should be modified or replaced with different image data.

In another preferred embodiment, the method also includes the step of associating the non-homogenous pixels with different image data which is determined from the image data for neighbor pixels.

A method for automatic removal of vertical streaks in accordance with another embodiment of the present invention includes the steps of: receiving image data pertaining to pixels of an image; and processing the image data to determine, in consideration of accumulative information pertaining to the pixels, whether the image data for a group of pixels is sufficiently different from the image data for neighbor pixels to designate pixels of the group of pixels as non-homogenous.

In a preferred embodiment, the method also includes the step of designating the non-homogenous pixels as parts of a non-homogenous streak depending upon locations of the non-homogenous pixels within the image.

In another preferred embodiment, the method also includes the step of assigning different image data to the non-homogenous pixels which are designated as parts of a non-homogenous streak.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

FIG. 2 is a partial perspective view of an array of optical sensors of the scanner of FIG. 1 and its unfolded optical path;

FIG. 3 is a functional block diagram showing a pixel-by-pixel gain applied to an output of the optical sensors of FIG. 2;

FIG. 15A shows a 5×5 array of pixels which is processed according to an exemplary preferred post scan processing step of the method of FIG. 11; and FIG. 15B shows a 3×3 array of pixels which is processed according to an alternative exemplary preferred post scan processing step of the method of FIG. 11.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
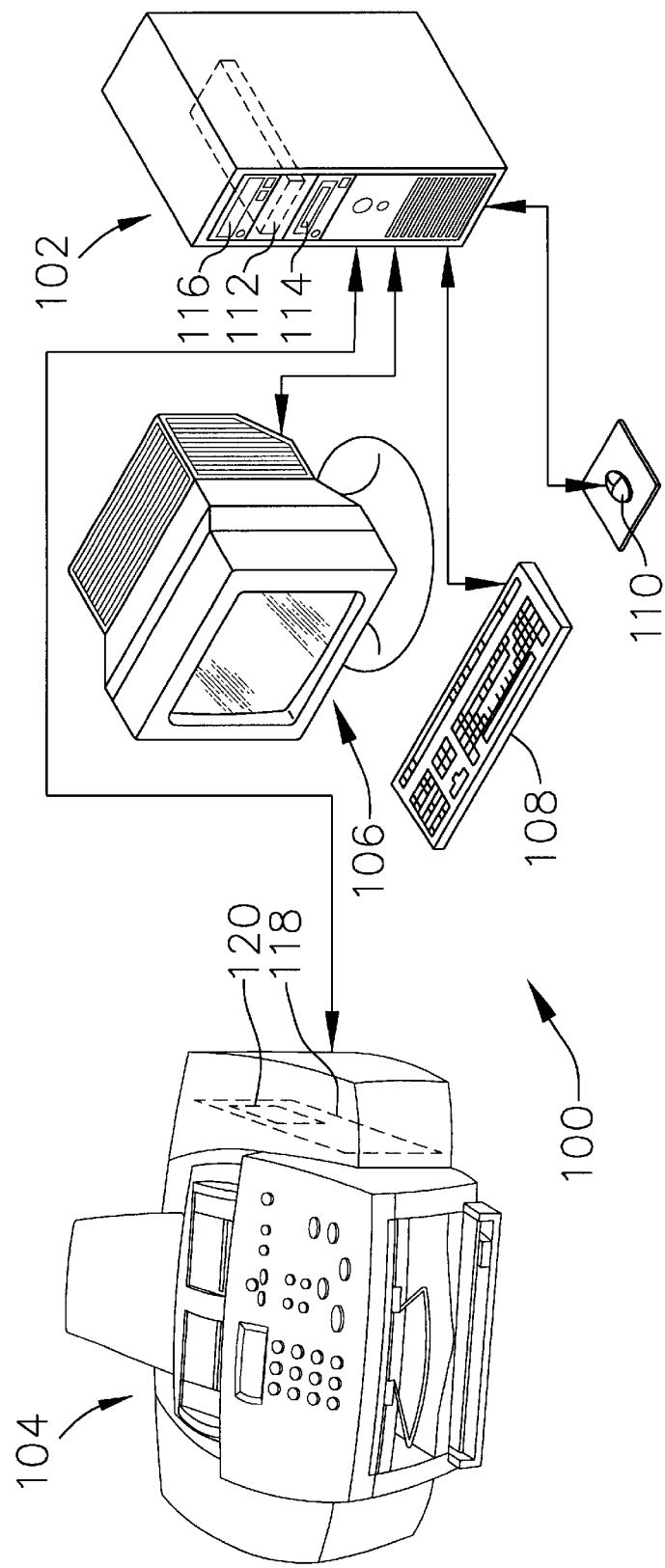
FIG. 1 is a perspective view of a system including a personal computer and a sheet fed scanner, the system being configured to employ the principles of the present invention.
Figure 4:
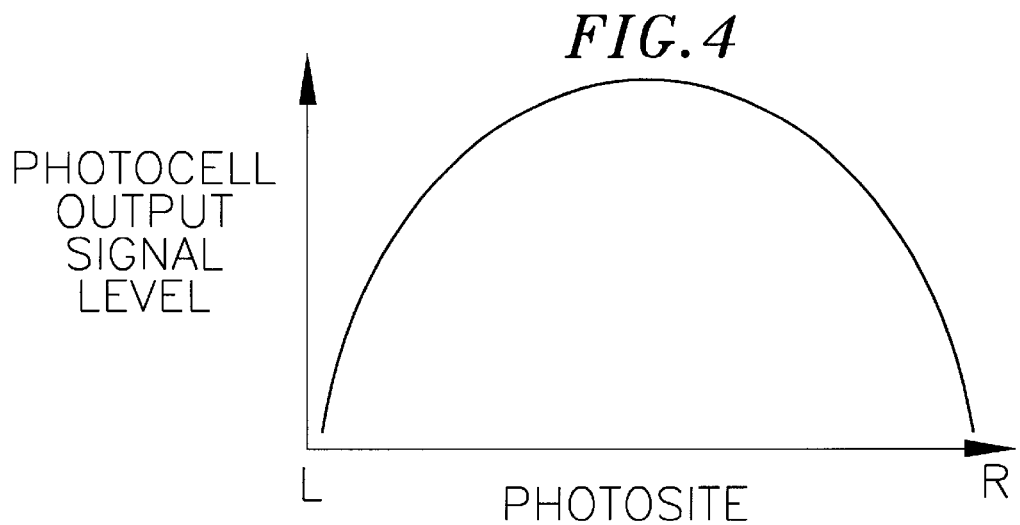
FIG. 4 is a graph of photosite output signal levels when the optical sensors of FIG. 2 are imaging an object of uniform color, such as a calibration strip, through the optical path.
Figure 5:
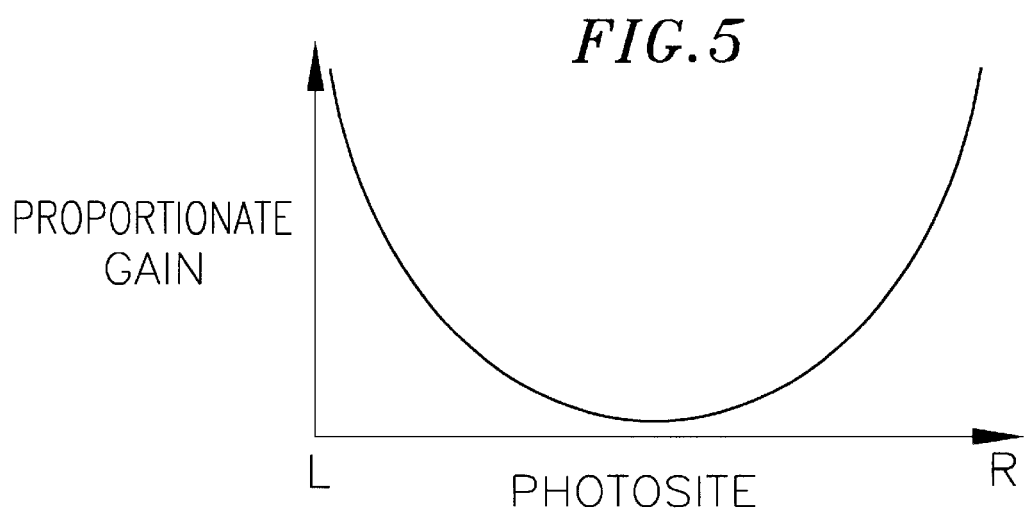
FIG. 5 is a graph of proportionate gain values calculated for the photosite output signal levels of FIG. 4.
Figure 6:
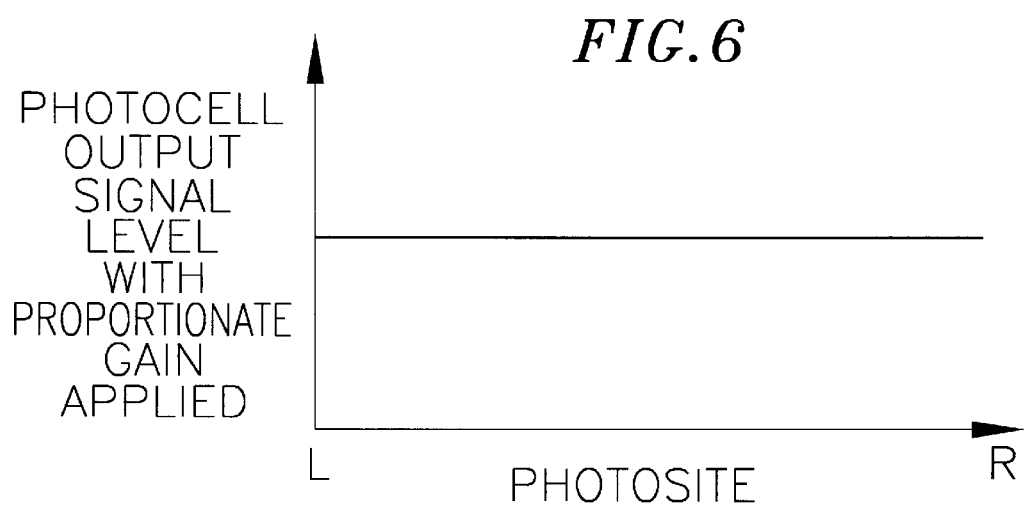
FIG. 6 is a graph of the photosite output signal levels of FIG. 4 with the proportionate gain of FIG. 5 applied.
Figure 7:
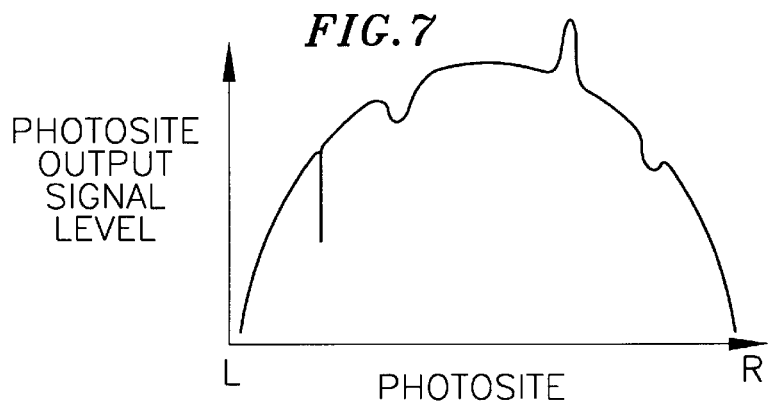
FIG. 7 is a graph of photosite output signal levels when the optical sensors of FIG. 2 are imaging an object of uniform color, such as a calibration strip, through the optical path, with the obstructions denoted as "A", "B", "C" and "D" positioned in the optical path as shown in FIG. 2.
Figure 8:
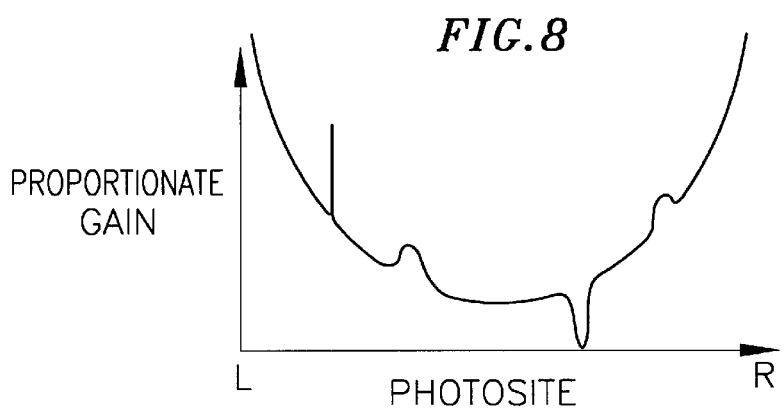
FIG. 8 is a graph of proportionate gain values calculated for the photosite output signal levels of FIG. 7.
Figure 9:
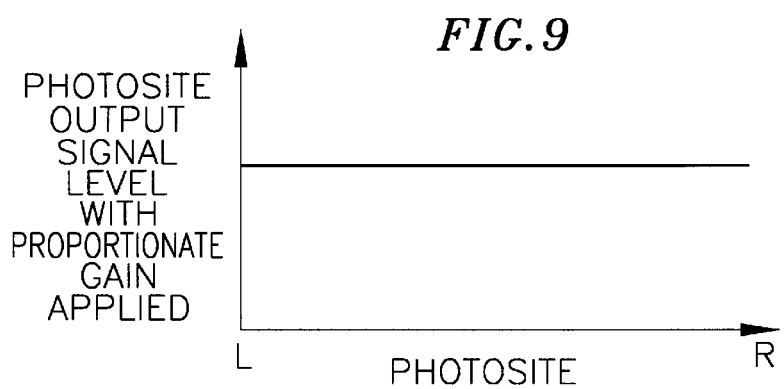
FIG. 9 is a graph of the photosite output signal levels of FIG. 7 with the proportionate gain of FIG. 8 applied.
Figure 10:
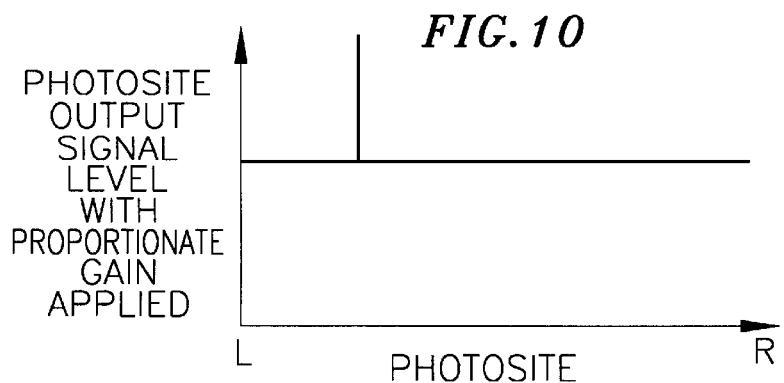
FIG. 10 is a graph of the photosite output signal levels of FIG. 7 with the proportionate gain of FIG. 8 applied after the "A" obstruction shown in FIG. 2 has been removed from the optical path.

FIG. 1 shows a system 100 configured to employ the principles of the present invention. The system 100 includes a computer 102, scanner 104, monitor 106 and various user-input devices such as a keyboard 108 and a mouse 110 functionally interconnected as shown. The computer 102 comprises, for example, a personal computer ("PC") with a hard drive 112 (shown in phantom lines), a disk drive 114 and a CD-ROM drive 116. An exemplary preferred scanner 104 comprises an "All-In-One" product such as the HP OfficeJet T Series (T45/65) which provides integrated printing, faxing, scanning and copying functions, all in color. The scarier 104 includes a circuit card 118 with firmware 120 (both shown in phantom lines).

According to the present invention, software employed by an exemplary preferred method for automatic removal of vertical streaks is stored in the hard drive 112. Data pertaining to the scanner 104 is stored in the firmware 120. The computer 102 executes the software, accessing data from the firmware 120 as needed. It should be understood, of course, that the scope of the present invention also includes software and data storage configurations other than the one just described.

The method for automatic removal of vertical streaks according to the present invention pertains to processing image data to identify "non-homogenous" elements (such as pixels) of the image data. In an exemplary preferred embodiment, the "non-homogenous elements" are those image elements which contribute to an abrupt or atypical spatial transition in a color characteristic (e.g., luminosity) associated with the elements of the image. Often, the non-homogenous elements contribute to erroneous color transitions (such as vertical lines or streaks) in the image.

Figure 11:
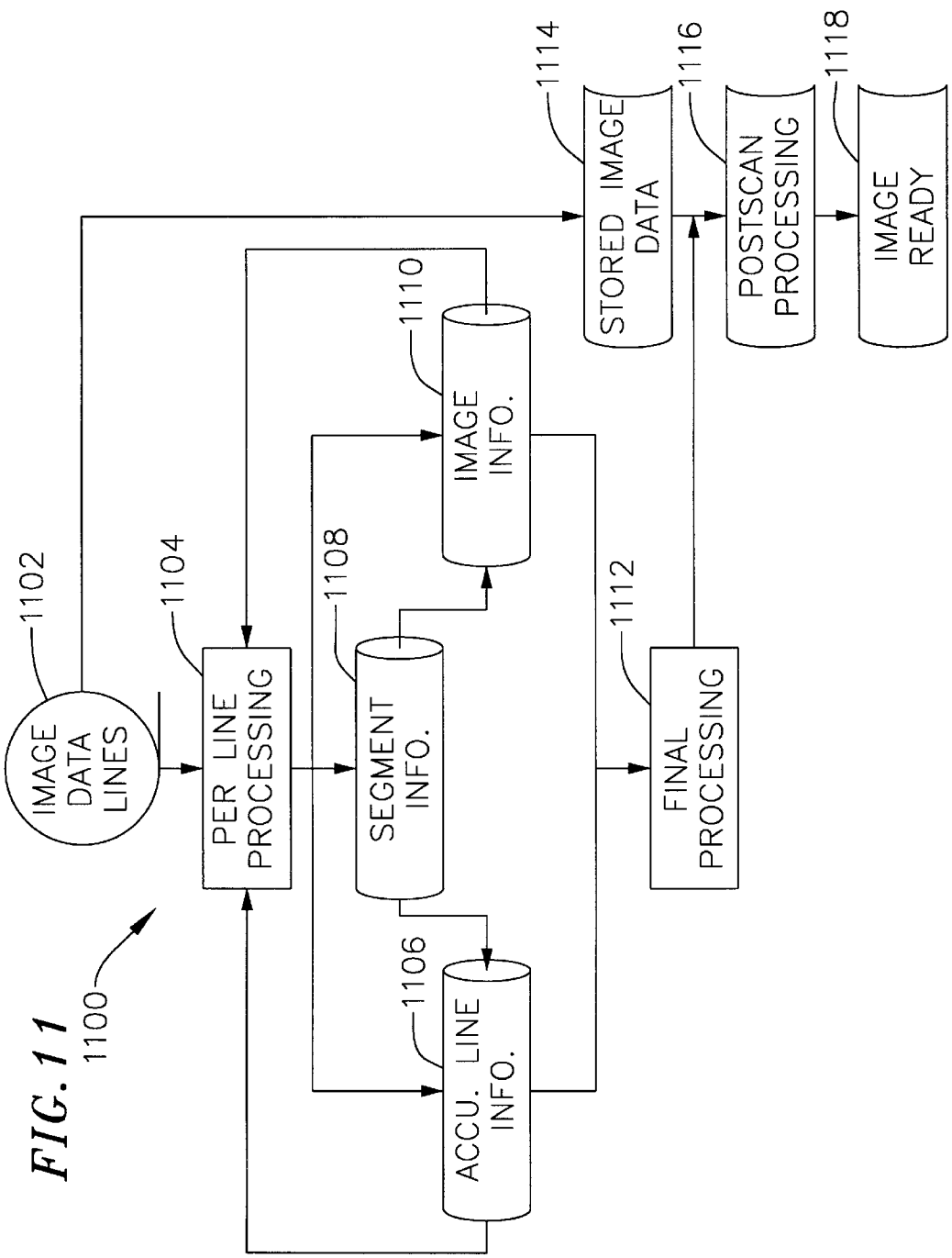
FIG. 11 is a flowchart showing a method for automatic removal of vertical streaks according to an exemplary preferred embodiment of the present invention.

FIG. 11 shows the steps of an exemplary preferred non-homogenous image element detection method 1100 according to the present invention. The image data lines 1102 are first processed according to a per line processing step 1104. The exemplary preferred method 1100 includes two additional processing steps: a final processing step 1112 and a post scan processing step 1114.

Generally, the per line processing step 1104 involves a comparison between a pixel and its neighboring pixels to determine whether the pixel is a non-homogenous image element. In the following discussion, the term "pixel" refers to the portion of an image generated from an output signal 302 of the optical sensor device 202. However, it should be understood that the present invention is not limited to an imaging arrangement where there is a one-to-one correspondence between the pixels (or other image elements) and the photosites of the optical sensor device 202.

Figure 12:
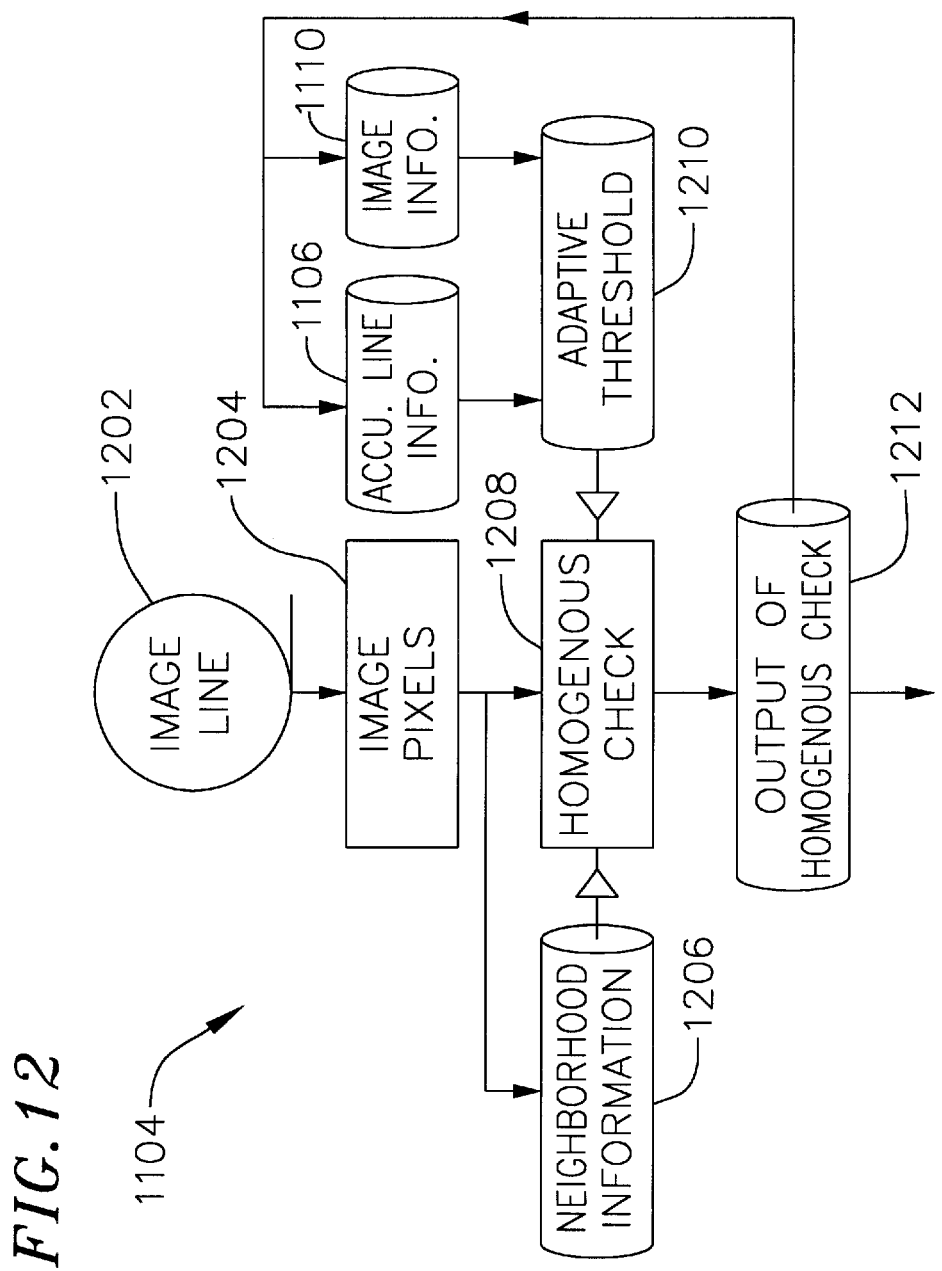
FIG. 12 is a flowchart showing layer line processing step of the method of FIG. 11.

FIG. 12 shows an exemplary preferred per line processing step 1104 according to the present invention. Data for an image line 1202 comprises image pixels 1204 along the fast scan direction 230 (FIG. 2). The image pixels 1204 therefore also include neighborhood information 1206 for a pixel under consideration. The image pixels 1204 and the neighborhood information 1206 are provided as data inputs to a homogenous check executable block 1208. Generally, the homogenous check output 1212 is a quantification of a likelihood of whether the pixel under consideration is non-homogenous. An exemplary preferred homogenous check 1208 makes this determination in consideration of accumulative line information 1106 pertaining to the pixel under consideration. In the homogenous check processing step 1208, the likelihood of a pixel being non-homogenous is determined as follows:

$$\text{distance}H = \max(w \cdot \text{distance}Y, \text{distance}RGB)$$

The distanceY is a luminosity difference between the pixel under consideration and a group of its neighbor pixels. The distanceRGB is a color difference between the pixel under consideration and a group of its neighbor pixels. The variable w is a weighting factor (e.g., w=2). In an exemplary preferred homogenous check processing step 1208, distanceY and distanceRGB are calculated as follows:

$$\text{distance}Y = |Y - Y_{ref}|, \text{ and}$$

$$\text{distance}RGB = \sqrt{(R-R_{ref})^2 + (G-G_{ref})^2 + (B-B_{ref})^2},$$

where Y, R, G, B are associated with the pixel under consideration and $Y_{ref}, R_{ref}, G_{ref}, B_{ref}$ are associated with the group of its neighbor pixels.

For each pixel (RGB) in the scan line, the vector [Y, R, G, B] is calculated employing a conventional 3×3 transformation such as used in JPEG and Ycc/Yuv spaces where, for example, the first row of the 3×3 matrix is:

$$Y = 0.300078125 * R + 0.5859375 * G + 0.11328125 * B.$$

The non-homogenous image element detection method 1100 of the present invention is suitable for both RGB scan and JPEG scan data. In the later case, the JPEG image data is first decoded into the Ycc space providing the Y information (no need to convert RGB to Y); the image is then converted to RGB for subsequent processing.

Figure 14:
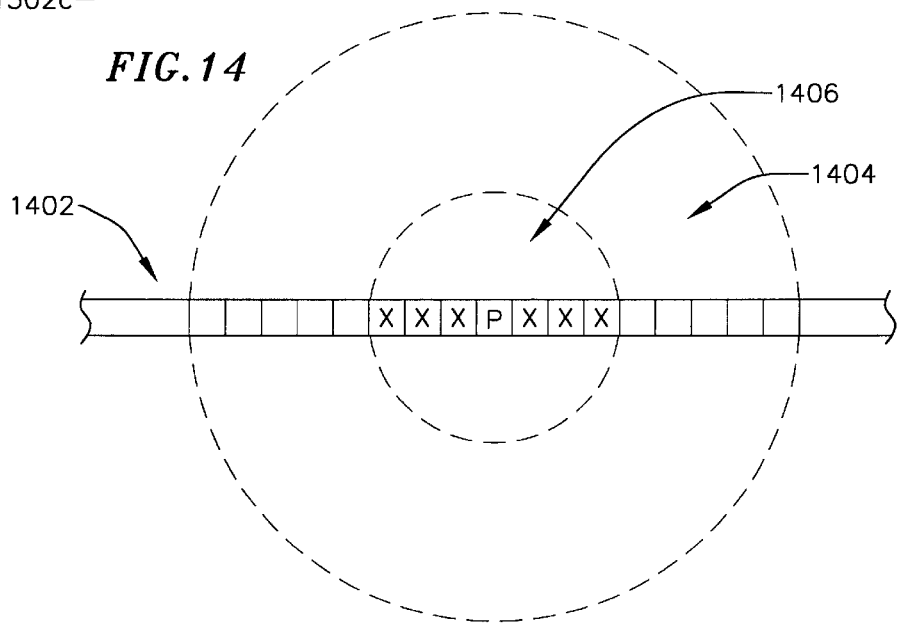
FIG. 14 illustrates a spatial relationship between a pixel under consideration during a homogenous check of the per line processing of FIG. 12 and its neighboring pixels.

With regard to $Y_{ref}, R_{ref}, G_{ref}, B_{ref}$, the average Y, R, G, B values for a group of neighbor pixels of a pixel under consideration are calculated as $[Y_{ref}, R_{ref}, G_{ref}, B_{ref}]$. Referring to FIG. 14, according to an exemplary preferred homogenous check processing step 1208, 5 neighbor pixels in a "neighbor zone" 1404 along a scan line 1402 of an image are considered on each side (L, R) of a pixel under consideration (designated by the letter "P") for a 300 dpi image. In an exemplary preferred embodiment, the pixels (designated by the letter "X") in a "neutral zone" 1406 which preferably includes 3 pixels for each side (L, R) for a 300 dpi image are excluded from the calculation. The neutral zone 1406 accommodates "bleed over" of colors and is adjusted to be larger or smaller depending upon the particular application, the size of the document being scanned, the resolution of the scan, and the quality of the optics. It should be understood that the scope of the present application also includes modifications to the number of pixels in the neighbor zone 1404 to accommodate particular imaging applications and scanner configurations.

Referring again to FIG. 12, after distanceH is calculated, it is compared to an Adaptive Threshold which is determined in consideration of the accumulative line information 1106. For example, the accumulative line information 1106 for a pixel under consideration is incremented each time the homogenous check output 1212 indicates that the pixel is non-homogenous and decremented each time the homogenous check output 1212 indicates that the pixel is homogenous. Since some images have specular information which could lead to false positive indications of non-homogenous image elements, the Adaptive Threshold is preferably set to an initial value which will cause the homogenous check 1208 to be less sensitive to nonhomogenous image elements. If non-homogenous pixels repeatedly occur for the output of a particular optical sensor device, the Adaptive Threshold is adjusted in a manner which makes the homogenous check 1208 more sensitive to non-homogenous image elements.

The number distanceRGB is always greater than distanceY; hence, the weighting factor w. According to an exemplary preferred homogenous check processing step 1208, distanceY is calculated in a "first pass". If this value exceeds the Adaptive Threshold, the homogenous check output 1212 indicates that pixel under consideration is non-homogenous and there is no need to calculate distanceRGB. If this value does not exceed the Adaptive Threshold, distanceRGB is then calculated and compared to the Adaptive Threshold. In most instances, this "first pass" decreases the amount of processing required to perform the homogenous check 1208. It should be understood that adjustments to the weighting factor w are made to accommodate particular imaging applications and scanner configurations.

Referring to FIG. 11, the next step of the exemplary preferred non-homogenous image element detection method 1100 is the final processing step 1112. Generally, the final processing step 1112 involves considering locations of the non-homogenous pixels within the image to determine whether the image data associated with the non-homogenous pixels should be modified or replaced with different image data. In an exemplary preferred embodiment, the image is divided into segments which are employed to make this determination.

Figure 13:
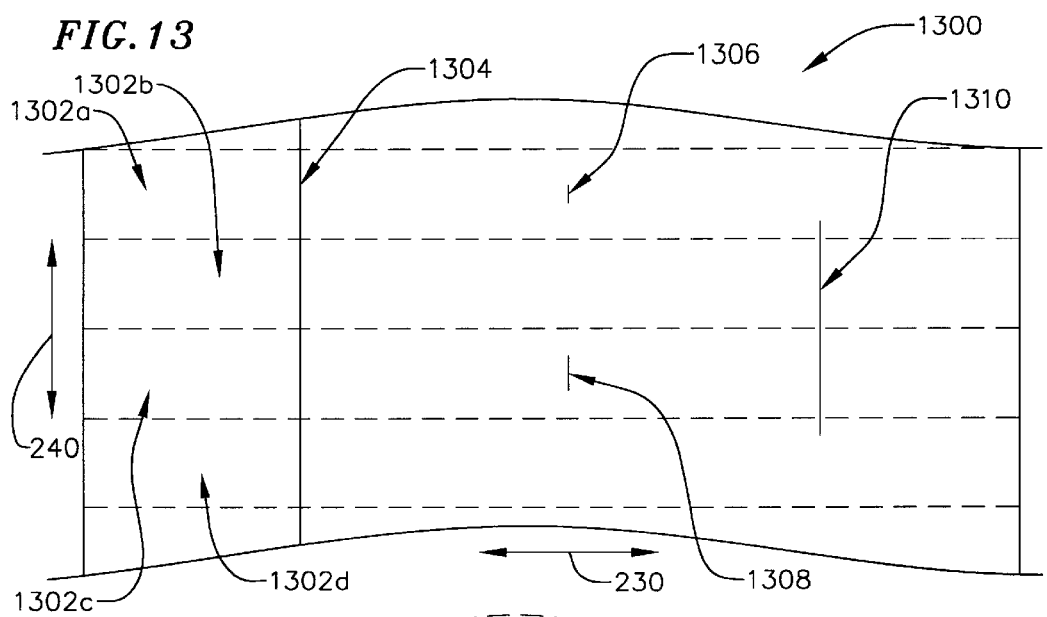
FIG. 13 is a partial front view of a sheet of printed media.

Referring to FIG. 13, an image 1300 is shown divided into segments 1302a, 1302b, 1302c and 1302d by horizontal dashed lines which are parallel to the fast scan axis 230 and perpendicular to the slow scan axis 240. For a 300 dpi letter-sized document which has around 3,300 scan lines, each segment includes, for example, 128 scan lines which are parallel to the slow scan axis 240. It should be understood, however, that the present invention is not limited to analyzing the image data in segments, or to analyzing the image data in segments of a particular size or arrangement.

The image 1300 includes vertical streaks 1304, 1306, 1308 and 1310 which are all parallel to the slow scan axis 240. Referring to FIG. 11, in an exemplary preferred final processing step 1112, the accumulative line information 1106, segment information 1108 and image information 1110 (which includes the homogenous check output 1212) are processed to identify vertical streaks at each position along the fast scan axis 230.

Referring to FIG. 13, in an exemplary preferred final processing step 1112, the non-homogenous pixels are designated as parts of a non-homogenous streak if the non-homogenous pixels are associated with a common optical sensor and occur a sufficient number of times within at least one of the segments. For the following discussion, assume that image data indicates that: the pixels of the vertical streak 1304 are associated with a common optical sensor; the pixels of the vertical streaks 1306 and 1308 are associated with a common optical sensor; and the pixels of the vertical streak 1310 are associated with a common optical sensor. Since the vertical streak 1304 occurs along the entire length of the image 1300, its pixels are designated as parts of a non-homogenous streak. Although the vertical streaks 1306 and 1308 are associated with a common optical sensor, in this example, they do not occur a sufficient number of times within their respective segments 1302a and 1302c for their pixels to be designated as parts of a non-homogenous streak.

In another exemplary preferred final processing step 1112, the non-homogenous pixels are designated as parts of a non-homogenous streak if the non-homogenous pixels are associated with a common optical sensor, and occur within a sufficient number of the segments. For example, if this number of segments is set at 3, then the vertical streaks 1306 and 1308 which only occur in 2 segments (segments 1302a and 1302c) do not occur within a sufficient number of the segments for their pixels to be designated as parts of a non-homogenous streak. The vertical streak 1310, however, does occur within a sufficient number of the segments for its pixels to be designated as parts of a non-homogenous streak because it spans across 4 segments (segments 1302a, 1302b, 1302c and 1302d). A variety of different schemes can be employed for identifying the non-homogenous pixels for which the image data should be modified or replaced with different image data.

It has been observed that non-homogenous image elements in need of correction rarely form vertical streaks which are 3 pixels wide or wider. Therefore, in an exemplary preferred final processing step 1112, if a vertical streak is a certain number of pixels wide, e.g., 3 pixels or wider, these image elements are not designated as parts of a non-homogenous streak.

Referring to FIG. 11, the next step of the exemplary preferred non-homogenous image element detection method 1100 is the post scan processing step 1116. The stored image data 1114 and the output of the final processing step 1112 are processed during the post scan processing step 1116 to generate corrected image data 1118.

Generally, the post scan processing step 1116 involves associating non-homogenous pixels with different image data. In an exemplary preferred post scan processing step 1116, the different image data is determined from the image data for neighbor pixels. The image data associated with the neighbor pixels can be processed in a variety of different ways to derive the different image data. In an exemplary preferred post scan processing step 1116, the different image data for a single non-homogenous pixel is determined by employing a median filter to process the image data for neighbor pixels, excluding the image data for neighbor pixels generated from a common optical sensor as the image data for the single non-homogenous pixel. FIG. 15A shows a 5×5 modified median filter employed to determine the different image data for the non-homogenous pixel (designated with the letter "P"). The neighbor pixels (designated with the letter "X") were generated from the same optical sensor as the pixel P. Therefore, the pixels X are excluded from the calculation. Alternatively, and referring to FIG. 15B, a 3×3 modified median filter can be employed to save processing overhead. Generally, the size of the filter depends upon the scan resolution (e.g., 500 dpi) and the nature of the object scanned.

Other approaches can be used to provide the different image data. For example, bi-cubic interpolation or linear interpolation techniques can be employed.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A method for automatic removal of vertical streaks, the method comprising the steps of:

receiving image data pertaining to pixels of an image;

processing the image data to determine, in consideration of accumulative information pertaining to the pixels, whether the image data for a group of pixels is sufficiently different from the image data for neighbor pixels to designate pixels of the group of pixels as non-homogenous; and designating the non-homogenous pixels as parts of a non-homogenous streak depending upon locations of the non-homogenous pixels within the image;

wherein the image is divided into segments; and wherein the non-homogenous pixels are designated as parts of a non-homogenous streak if the non-homogenous pixels are associated with a common optical sensor and occur a sufficient number of times within at least one of the segments.

2. A method as claimed in claim 1, wherein a pixel of the group of pixels is designated as non-homogenous if a luminosity of the pixel is sufficiently different from a luminosity associated with the neighbor pixels.

3. A method as claimed in claim 1, wherein a pixel of the group of pixels is designated as non-homogenous if a color characteristic of the pixel is sufficiently different from a color characteristic associated with the neighbor pixels.

4. A method as claimed in claim 1, wherein the processing step employs an adaptive threshold which is adjusted in consideration of the accumulative information.

5. A method as claimed in claim 4, wherein the accumulative information pertains to a sequence of pixels for which the image data are generated by the common optical sensor.

6. A method as claimed in claim 5, wherein the adaptive threshold is adjusted depending upon whether the pixels of the sequence are non-homogenous.

7. A method as claimed in claim 1, further comprising the step of:

assigning different image data to the non-homogenous pixels which are designated as parts of a non-homogenous streak.

8. A method as claimed in claim 7, wherein the different image data is determined from the image data for neighbor pixels.

9. A method as claimed in claim 8, wherein the different image data for a single non-homogenous pixel is determined by employing a median filter to process the image data for neighbor pixels of the single non-homogenous pixel excluding image data for neighbor pixels generated from the common optical sensor as the image data for the single non-homogenous pixel.

10. A method for automatic removal of vertical streaks, the method comprising the steps of:

receiving image data pertaining to pixels of an image;

processing the image data to determine, in consideration of accumulative information pertaining to the pixels, whether the image data for a group of pixels is sufficiently different from the image data for neighbor pixels to designate pixels of the group of pixels as non-homogenous; and designating the non-homogenous pixels as parts of a non-homogenous streak depending upon locations of the non-homogenous pixels within the image;

wherein the image is divided into segments; and wherein the non-homogenous pixels are designated as parts of a non-homogenous streak if the non-homogenous pixels are associated with a common optical sensor and occur within a sufficient number of the segments.

11. A method as claimed in claim 10, wherein a pixel of the group of pixels is designated as non-homogenous if a luminosity of the pixel is sufficiently different from a luminosity associated with the neighbor pixels.

12. A method as claimed in claim 10, wherein a pixel of the group of pixels is designated as non-homogenous if a color characteristic of the pixel is sufficiently different from a color characteristic associated with the neighbor pixels.

13. A method as claimed in claim 10, wherein the processing step employs an adaptive threshold which is adjusted in consideration of the accumulative information.

14. A method as claimed in claim 13, wherein the accumulative information pertains to a sequence of pixels for which the image data are generated by the common optical sensor.

15. A method as claimed in claim 14, wherein the adaptive threshold is adjusted depending upon whether the pixels of the sequence are non-homogenous.

16. A method as claimed in claim 10, further comprising the step of:

assigning different image data to the non-homogenous pixels which are designated as parts of a non-homogenous streak.

17. A method as claimed in claim 16, wherein the different image data is determined from the image data for neighbor pixels.

18. A method as claimed in claim 17, wherein the different image data for a single non-homogenous pixel is determined by employing a median filter to process the image data for neighbor pixels of the single non-homogenous pixel excluding image data for neighbor pixels generated from the common optical sensor as the image data for the single non-homogenous pixel.

19. A method for automatic removal of vertical streaks, the method comprising the steps of:

receiving image data pertaining to pixels of an image;

processing the image data to determine, in consideration of accumulative information pertaining to the pixels whether the image data for a group of pixels is sufficiently different from the image data for neighbor pixels to designate pixels of the group of pixels as non-homogenous;

designating the non-homogenous pixels as parts of a non-homogenous streak depending upon locations of the non-homogenous pixels within the image; and assigning different image data to the non-homogenous pixels which are designated as parts of a non-homogenous streak;

wherein the different image data is determined from the image data for neighbor pixels;

wherein the different image data for a single non-homogenous pixel is determined by employing a median filter to process the image data for neighbor pixels of the single non-homogenous pixel excluding image data for neighbor pixels generated from a common optical sensor as the image data for the single non-homogenous pixel.

20. A method as claimed in claim 19, wherein a pixel of the group of pixels is designated as non-homogenous if a luminosity of the pixel is sufficiently different from a luminosity associated with the neighbor pixels.

21. A method as claimed in claim 19, wherein a pixel of the group of pixels is designated as non-homogenous if a color characteristic of the pixel is sufficiently different from a color characteristic associated with the neighbor pixels.

22. A method as claimed in claim 19, wherein the processing step employs an adaptive threshold which is adjusted in consideration of the accumulative information.

23. A method as claimed in claim 22, wherein the accumulative information pertains to a sequence of pixels for which the image data are generated by the common optical sensor.

24. A method as claimed in claim 23, wherein the adaptive threshold is adjusted depending upon whether the pixels of the sequence are non-homogenous.

* * * * *